US010682012B2

(12) United States Patent
Guo

(10) Patent No.: US 10,682,012 B2
(45) Date of Patent: Jun. 16, 2020

(54) BARBECUE GRILL

(71) Applicant: Yanrong Guo, Guangzhou (CN)

(72) Inventor: Yanrong Guo, Guangzhou (CN)

(*) Notice: Subject to any disclaimer, the term of this patent is extended or adjusted under 35 U.S.C. 154(b) by 190 days.

(21) Appl. No.: 16/013,908

(22) Filed: Jun. 20, 2018

(65) Prior Publication Data
US 2019/0000269 A1 Jan. 3, 2019

(30) Foreign Application Priority Data

Jun. 28, 2017 (CN) .......................... 2017 1 0511823

(51) Int. Cl.
*A47J 37/06* (2006.01)
*A47J 37/07* (2006.01)

(52) U.S. Cl.
CPC ....... *A47J 37/0763* (2013.01); *A47J 37/0688* (2013.01); *A47J 37/0718* (2013.01); *A47J 2037/0777* (2013.01)

(58) Field of Classification Search
CPC ................ A47J 37/0688; A47J 37/0718; A47J 37/0722; A47J 37/0727; A47J 37/0731; A47J 37/0736; A47J 37/074; A47J 2037/0777
USPC .......................................................... 99/449
See application file for complete search history.

(56) References Cited

U.S. PATENT DOCUMENTS

| 3,358,585 A | * | 12/1967 | Scherer | ............... A47J 37/0718 99/340 |
| 3,593,648 A | * | 7/1971 | Walters | ............... A47J 37/0688 99/349 |
| 4,884,499 A | * | 12/1989 | Rensch | ............... A47J 37/0688 99/449 |

FOREIGN PATENT DOCUMENTS

FR 1414620 * 9/1965 ...... A47J 2037/0777

* cited by examiner

*Primary Examiner* — Reginald Alexander
(74) *Attorney, Agent, or Firm* — Matthias Scholl P.C.; Scholl Matthias

(57) ABSTRACT

A barbecue grill, including a first cover plate, a first furnace wall, a second furnace wall, a second cover plate, and a hinge seat. The first cover plate includes first hinge members, and each first hinge member includes a first unfixed terminal. The first furnace wall includes second hinge members, and each second hinge member includes a second unfixed terminal. The second furnace wall includes third hinge members, and each third hinge member includes a third unfixed terminal. The second cover plate includes fourth hinge members, and each fourth hinge member includes a fourth unfixed terminal. The first hinge members are disposed on two sides of one end of the first cover plate, respectively, and the first hinge members are fixed on the hinge seat via a first hinged pin. The second hinge members are disposed on two sides of one end of the first furnace wall, respectively.

10 Claims, 3 Drawing Sheets

BARBECUE GRILL

CROSS-REFERENCE TO RELATED APPLICATIONS

Pursuant to 35 U.S.C. § 119 and the Paris Convention Treaty, this application claims foreign priority to Chinese Patent Application No. 201710511823.4 filed Jun. 28, 2017, the contents of which and any intervening amendments thereto are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

This disclosure relates to the field of barbecue equipment, and more particularly to a foldable barbecue grill.

Description of the Related Art

Conventional barbecue grills are bulky and not meant to be disassembled, so it is difficult and arduous to move them between locations.

SUMMARY OF THE INVENTION

In view of the above-described problems, it is an objective of the invention to a barbecue grill that is foldable and convenient to carry.

To achieve the above objective, according to one embodiment of the invention, there is provided a barbecue grill comprising a first cover plate, a first furnace wall, a second furnace wall, a second cover plate, and a hinge seat. The first cover plate comprises first hinge members, and each first hinge member comprises a first unfixed terminal. The first furnace wall comprises second hinge members, and each second hinge member comprises a second unfixed terminal. The second furnace wall comprises third hinge members, and each third hinge member comprises a third unfixed terminal. The second cover plate comprises fourth hinge members, and each fourth hinge member comprises a fourth unfixed terminal.

The first hinge members are disposed on two sides of one end of the first cover plate, respectively, and the first hinge members are fixed on the hinge seat via a first hinged pin; the second hinge members are disposed on two sides of one end of the first furnace wall, respectively, and the second hinge members are fixed on the hinge seat via a second hinged pin; the third hinge members are disposed on two sides of one end of the second furnace wall, respectively, and the third hinge members are fixed on the hinge seat via a third hinged pin; the fourth hinge members are disposed on two sides of one end of the second cover plate, respectively, and the fourth hinge members are fixed on the hinge seat via a fourth hinged pin.

In an unfolded state, an included angle between the first cover plate and the second cover plate is greater than 90 degrees, and an included angle between the first furnace wall and the second furnace wall is smaller than 90 degrees.

When a maximum spacing between the first unfixed terminal and the first hinged pin is a first spacing, and a maximum spacing between the second unfixed terminal and the second hinged pin is a second spacing, then a sum of the first spacing and the second spacing is greater than a distance between the first hinged pin and the second hinged pin; and when a maximum spacing between the third unfixed terminal and the third hinged pin is a third spacing, and a maximum spacing between the fourth unfixed terminal and the fourth hinged pin is a fourth spacing, then a sum of the third spacing and the fourth spacing is greater than a distance between the third hinged pin and the fourth hinged pin.

In a class of this embodiment, in a folded state, a minimum spacing between the first hinged pin and the second unfixed terminal is greater than the first spacing; in an unfolded state, a minimum spacing between the first unfixed terminal of the first cover plate and the second hinged pin is greater than the second spacing, and the first unfixed terminal butts against the second unfixed terminal; in a folded state, a minimum spacing between the fourth hinged pin and the third unfixed terminal is greater than the fourth spacing; in an unfolded state, a minimum spacing between the fourth unfixed terminal of the second cover plate and the third hinged pin is greater than the third spacing, and the third unfixed terminal butts against the fourth unfixed terminal.

In a class of this embodiment, the second hinged pin and the third hinged pin are positioned on an upper part of the hinge seat, and the first hinged pin and the fourth hinged pin are positioned on a lower part of the hinge seat; the second hinged pin and the third hinged pin are symmetrically disposed along a center line of the barbecue grill, and the first hinged pin and the fourth hinged pin are symmetrically disposed along the center line; and a distance between the second hinged pin and the third hinged pin is smaller than a distance between the first hinged pin and the fourth hinged pin.

In a class of this embodiment, a first stop block is disposed on the hinge seat along the center line for preventing the second hinged member and the third hinged member from crossing the center line of the hinge seat.

In a class of this embodiment, the included angle between the first cover plate and the second cover plate is between 110 and 160 degrees, and the included angle between the first furnace wall and the second furnace wall is between 20 and 70 degrees.

In a class of this embodiment, the barbecue grill further comprises a curved bottom tank for collecting charcoal ash, and the curved bottom tank comprises two ends fixedly connected to the hinge seat and an opening corresponding the included angle formed by the first furnace wall and the second furnace wall.

In a class of this embodiment, in the unfolded state, the first cover plate and the second cover plate butt against outer surfaces of the curved bottom tank.

In a class of this embodiment, the hinge seat further comprises second stop blocks which are adapted to limit the rotation of the second hinge members and the third hinge members in an unfolded state.

In a class of this embodiment, two sides of the first furnace wall are provided with support fans for locking the second furnace wall in the unfolded state.

In a class of this embodiment, a rotatable angle of the first cover plate is the same as that of the second cover plate; a rotatable angle of the first furnace wall is the same as that of the second furnace wall; the first cover plate and the second cover plate are symmetrically disposed, and the first furnace wall and the second furnace wall are also symmetrically disposed.

Advantages of the barbecue grill are summarized as follows. The first cover plate, the first furnace wall, the second furnace wall, and the second cover plate of the barbecue grill are adjacently connected to one another and are symmetrically hinged on the hinge seat using corresponding hinge members, and they are capable of rotating and folding, so the barbecue grill is foldable, self-supportive, and easy to carry.

Figure 1:
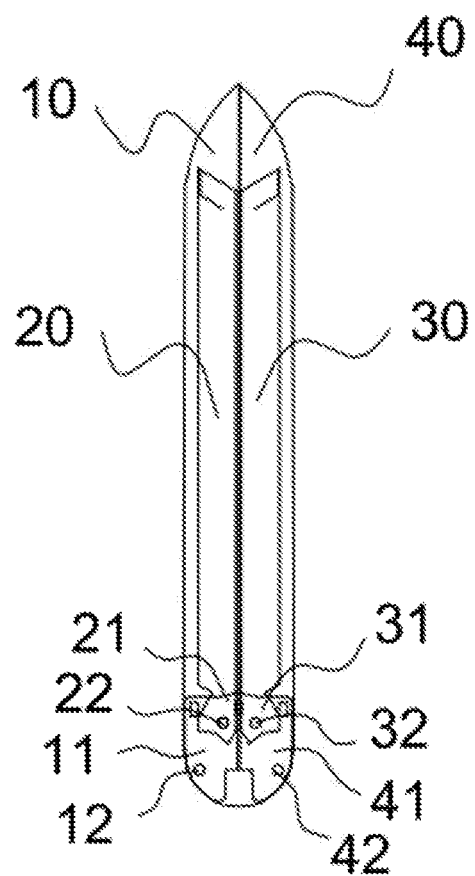
FIG. 1 is a schematic diagram of a barbecue grill in a folded state in accordance with one embodiment of the disclosure.

In the drawings, the following reference numbers are used: 10. First cover plate; 11. First hinge member; 12. First hinged pin; 13. First unfixed terminal; 20. First furnace wall; 21. Second hinge member; 22. Second hinged pin; 23. Second unfixed terminal; 30. Second furnace wall; 31. Third hinge member; 32. Third hinged pin; 33. Third unfixed terminal; 40. Second cover plate; 41. Fourth hinge member; 42. Fourth hinged pin; 43. Fourth unfixed terminal; 50. Hinge seat; 51. First stop block; 52. Second stop block.

DETAILED DESCRIPTION OF THE EMBODIMENTS

To further illustrate the invention, experiments detailing a barbecue grill are described below.

It should be noted that when an element is called "connect" to another element, it can be directly connected to another element or an intermediate element may exist therebetween. The terms used in this specification including "fixed", "connected", "forward", "after", "left", "right", "top", "bottom", and the like are only for the purpose of explanation. The term "and/or" used in this specification includes any and/or all combinations of one or more related items. The first, second, etc. used in this invention are only for the convenience of the numbering, but cannot be understood as indicating or implying its relative importance or the amount of mentioned technical characteristics. The definition of the first, second technical characteristic described in this disclosure means clearly or implicitly at least one of the technical characteristics is included.

The disclosure provides a barbecue grill.

Figure 2:
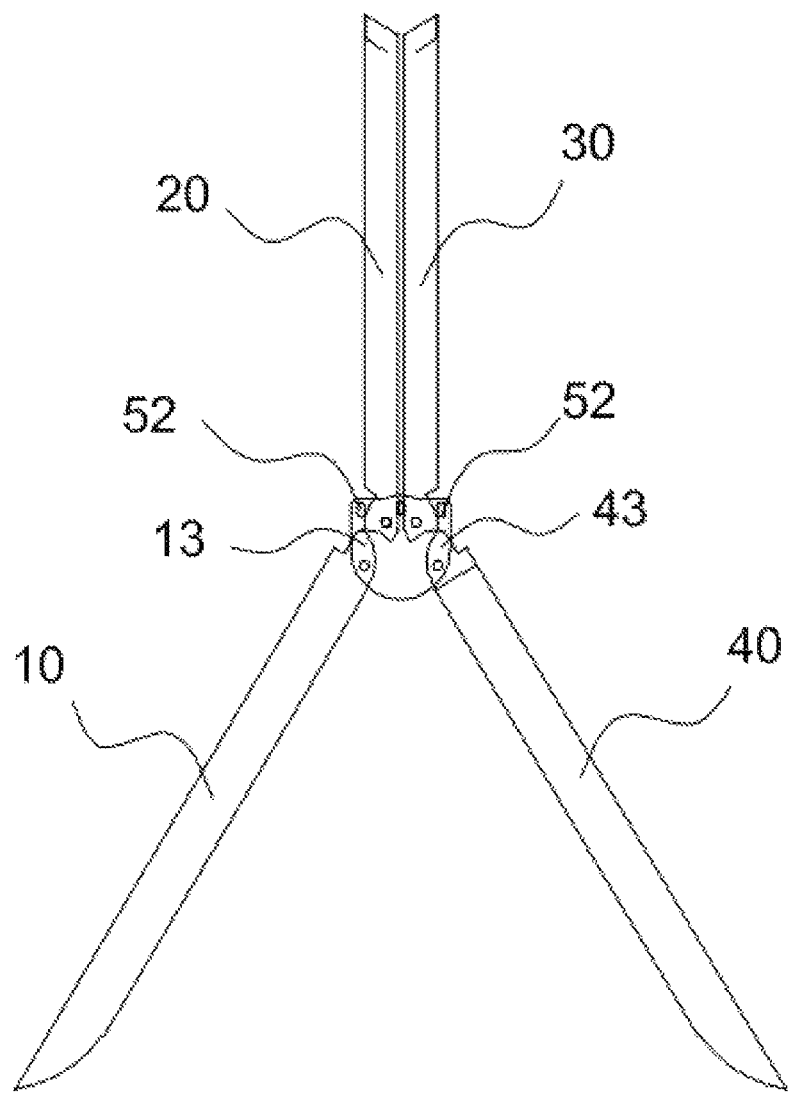
FIG. 2 is a schematic diagram of a barbecue grill in FIG. 1 with the first and second cover plates unfolded.
Figure 3:
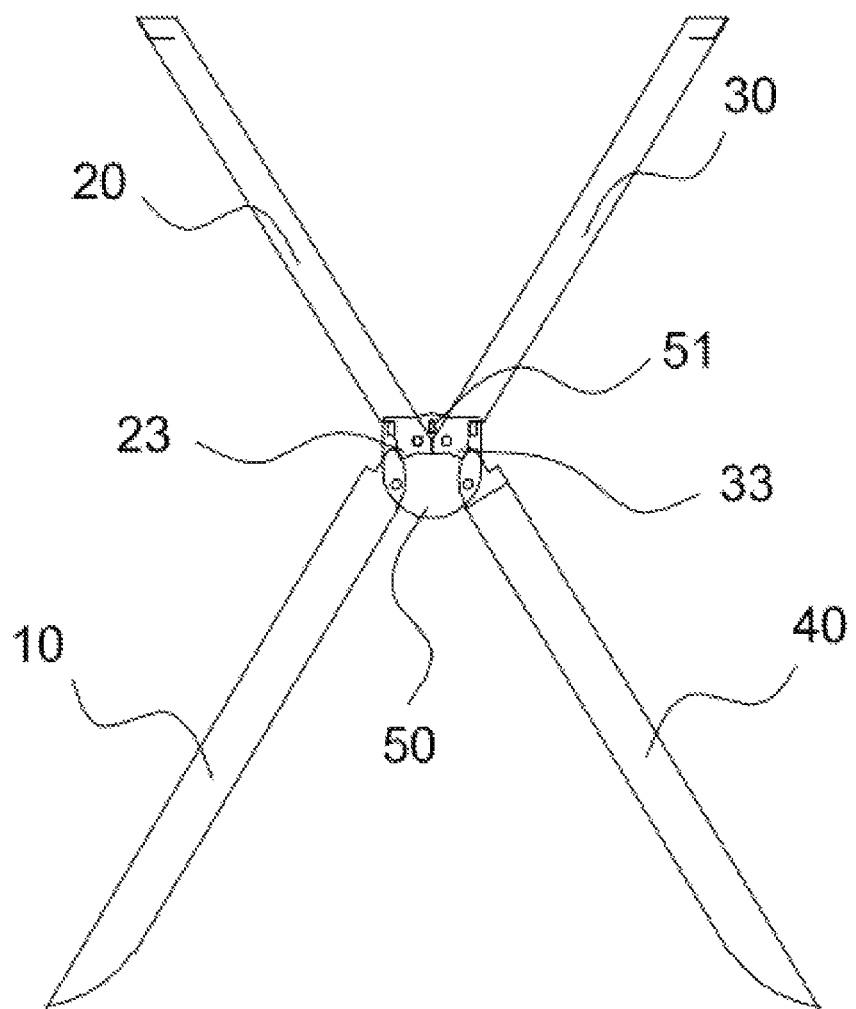
FIG. 3 is a schematic diagram of a barbecue grill in FIG. 2 in an unfolded state.

As shown in FIGS. 1-3, the barbecue grill of the disclosure is foldable and comprises a first cover plate 10, a first furnace wall 20, a second furnace wall 30, and a second cover plate 40 which are adjacently connected to one another in a proper order. First hinge members 11 are disposed on two sides of one end of the first cover plate 10, respectively, and the first hinge members 11 are fixed on a hinge seat 50 via a first hinged pin 12. Second hinge members 21 are disposed on two sides of one end of the first furnace wall 20, respectively, and the second hinge members 21 are fixed on the hinge seat 50 via a second hinged pin 22. Third hinge members 31 are disposed on two sides of one end of the second furnace wall 30, respectively, and the third hinge members 31 are fixed on the hinge seat 50 via a third hinged pin 32. Fourth hinge members 41 are disposed on two sides of one end of the second cover plate 40, respectively, and the fourth hinge members 41 are fixed on the hinge seat 50 via a fourth hinged pin 42. In this example, two hinge seats 50 are provided, and are respectively disposed at two sides of the bottoms of the first cover plate 10, the first furnace wall 20, the second furnace wall 30, and the second cover plate 40.

The first cover plate 10 and the second cover plate 40 are in mirror symmetry; the first furnace wall 20 and the second furnace wall 30 are in mirror symmetry; the first hinge members 11 and the fourth hinge members 41 are in mirror symmetry; and the second hinge members 21 and the third hinge members 31 are in mirror symmetry. The folded barbecue grill is in the shape of a box, particularly, in the shape of a notebook. To unfold the folded barbecue grill, the rotation angle of the first cover plate 10 is the same as that of the second cover plate 40. In the unfolded state, the included angle between the first cover plate 10 and the second cover plate 40 is greater than 90 degrees, the opening formed by the first cover plate and the second cover plate faces down, the first cover plate and the second cover plate stand on the ground for supporting. The rotation angle of the first furnace wall 20 is the same as that of the second furnace wall 30. In the unfolded state, the included angle between the first furnace wall 20 and the second furnace wall 30 is smaller than 90 degrees, and the opening formed by the first furnace wall and the furnace wall faces upwards. A barbecue wire mesh is placed in the opening for accommodating the barbecue food.

As shown in FIGS. 2 and 3, the first hinge members 11 comprise a first unfixed terminal 13; the second hinge member 21 comprise a second unfixed terminal 23; the third hinge member 31 comprise a second unfixed terminal 33; and the fourth hinge member 41 comprise a second unfixed terminal 43. When a maximum spacing between the first unfixed terminal 13 and the first hinged pin 12 is a first spacing, and a maximum spacing between the second unfixed terminal 23 and the second hinged pin 22 is a second spacing, then a sum of the first spacing and the second spacing is greater than a distance between the first hinged pin 12 and the second hinged pin 22. Thus, to rotate the first cover plate 10, the first hinge members 11 rotate accordingly; when the first hinge members 11 rotate at a set angle, the orientation of the first unfixed terminal 13 turns from facing downward to facing upward; thereafter, to rotate the first furnace wall 20, the second hinge members 21 rotate accordingly; when the second hinge members 21 rotate at a set angle, the second unfixed terminal 23 always faces downward. Reversely rotate the first hinge members 11 at a certain angle, the first unfixed terminal 13 is clamped in the second unfixed terminal 23, limiting the further rotation of the first hinge members 11.

When a maximum spacing between the third unfixed terminal 33 and the third hinged pin 32 is a third spacing, and a maximum spacing between the fourth unfixed terminal 43 and the fourth hinged pin 42 is a fourth spacing, then a sum of the third spacing and the fourth spacing is greater than a distance between the third hinged pin and the fourth hinged pin. The rotation process of the fourth hinge members 41 and the third hinge members 31 is the same as that of the first hinge members 11 and the second hinge members 21. In the unfolded state of the barbecue grill, the second unfixed terminal and the second unfixed terminal cooperate to limit the position of the first unfixed terminal and the fourth unfixed terminal, without involving extra complex structures such as fasteners or dampers for supporting and fixing. This simplifies the barbecue grill, makes the structure reliable.

Furthermore, in this example, in a folded state, a minimum spacing between the first hinged pin 12 and the second unfixed terminal 23 is greater than the first spacing, so that the orientation of the first unfixed terminal 13 can turn from facing downward to facing upward, without colliding with the second unfixed terminal 23. When the first cover plate 10 is unfolded in a certain angle, a minimum spacing between the first unfixed terminal 13 of the first cover plate and the second hinged pin 22 is greater than the second spacing, so that the second unfixed terminal 23 can rotate smoothly, without colliding with the first unfixed terminal. When the first furnace wall 20 is unfolded to a set angle, reversely rotate the first cover plate 10, and then the first unfixed terminal 13 butts against the second unfixed terminal 23, limiting the further rotation of the first cover plate 10.

Likewise, in a folded state, a minimum spacing between the fourth hinged pin 42 and the third unfixed terminal 33 is greater than the fourth spacing; when the fourth cover plate 40 is unfolded at a set angle, a minimum spacing between the fourth unfixed terminal 43 of the second cover plate and the third hinged pin 32 is greater than the third spacing. When the second furnace wall 30 is unfolded to a set angle, reversely rotate the second cover plate 40, and the third unfixed terminal 33 butts against the fourth unfixed terminal 43.

The second hinged pin 22 and the third hinged pin 32 are positioned on an upper part of the hinge seat 50, and the first hinged pin 12 and the fourth hinged pin 42 are positioned on a lower part of the hinge seat 50; the second hinged pin 22 and the third hinged pin 32 are symmetrically disposed along a center line of the barbecue grill, and the first hinged pin 12 and the fourth hinged pin 42 are symmetrically disposed along the center line; and a distance between the second hinged pin 22 and the third hinged pin 32 is smaller than a distance between the first hinged pin 12 and the fourth hinged pin 42. This facilitates the rotation of the first cover plate 10 and the second cover plate 40 and the design of the first hinge members 11 and the fourth hinge members 41.

Preferably, a first stop block 51 is disposed on the hinge seat 50 along the center line for preventing the second hinged member 21 and the third hinged member 31 from crossing the center line of the hinge seat.

Preferably, the included angle between the first cover plate 10 and the second cover plate 40 is between 110 and 160 degrees, and the included angle between the first furnace wall 20 and the second furnace wall 30 is between 20 and 70 degrees.

The barbecue grill further comprises a curved bottom tank (not shown in the drawings) for collecting charcoal ash. The curved bottom tank comprises two ends fixedly connected to the hinge seat 50 and an opening corresponding the included angle formed by the first furnace wall and the second furnace wall. The width of the opening is no less than the distance of the bottoms of the first furnace wall and the second furnace wall.

Preferably, when the first cover plate 10 and the second cover plate 40 are unfolded to a set angle, the first cover plate 10 and the second cover plate 40 butt against outer surfaces of the curved bottom tank, thus limiting the further rotation of the first cover plate 10 and the second cover plate 40.

The hinge seat 50 further comprises second stop blocks 52 which are adapted to limit the rotation of the second hinge members 21 and the third hinge members 31 in an unfolded state. The second stop blocks 52 are disposed above the first hinged pin 12 and the second hinged pin 22.

Furthermore, support fans (not shown in the drawings) are hinged on two sides of the first furnace wall 20 for locking the second furnace wall 30 in the unfolded state. The support fans are windproof and in the shape of an inverted trapezoidal structure. The upper inner walls of the first furnace wall 20 and the second furnace wall 30 are provided with support fins for supporting the barbecue wire mesh.

To fold the barbecue grill, the support fans are first withdrawn in the first furnace wall, followed by folding the first furnace wall 20 and the second furnace wall 30, and then draw in the first cover plate 10 and the second cover plate 40.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A barbecue grill, comprising:
    1) a first cover plate comprising first hinge members, each first hinge member comprising a first unfixed terminal;
    2) a first furnace wall comprising second hinge members, each second hinge member comprising a second unfixed terminal;
    3) a second furnace wall comprising third hinge members, each third hinge member comprising a third unfixed terminal;
    4) a second cover plate comprising fourth hinge members, each fourth hinge member comprising a fourth unfixed terminal; and
    5) a hinge seat;

wherein:
   the first hinge members are disposed on two sides of one end of the first cover plate, respectively, and the first hinge members are fixed on the hinge seat via a first hinged pin;
   the second hinge members are disposed on two sides of one end of the first furnace wall, respectively, and the second hinge members are fixed on the hinge seat via a second hinged pin;
   the third hinge members are disposed on two sides of one end of the second furnace wall, respectively, and the third hinge members are fixed on the hinge seat via a third hinged pin;
   the fourth hinge members are disposed on two sides of one end of the second cover plate, respectively, and the fourth hinge members are fixed on the hinge seat via a fourth hinged pin;
   in an unfolded state, an included angle between the first cover plate and the second cover plate is greater than 90 degrees, and an included angle between the first furnace wall and the second furnace wall is smaller than 90 degrees;
   when a maximum spacing between the first unfixed terminal and the first hinged pin is a first spacing, and a maximum spacing between the second unfixed terminal and the second hinged pin is a second spacing, then a sum of the first spacing and the second spacing is greater than a distance between the first hinged pin and the second hinged pin; and
   when a maximum spacing between the third unfixed terminal and the third hinged pin is a third spacing, and a maximum spacing between the fourth unfixed terminal and the fourth hinged pin is a fourth spacing, then a sum of the third spacing and the fourth spacing is greater than a distance between the third hinged pin and the fourth hinged pin.

2. The grill of claim 1, wherein:
in a folded state, a minimum spacing between the first hinged pin and the second unfixed terminal is greater than the first spacing; in an unfolded state, a minimum spacing between the first unfixed terminal of the first cover plate and the second hinged pin is greater than the second spacing, and the first unfixed terminal butts against the second unfixed terminal; and
in a folded state, a minimum spacing between the fourth hinged pin and the third unfixed terminal is greater than the fourth spacing; in an unfolded state, a minimum spacing between the fourth unfixed terminal of the second cover plate and the third hinged pin is greater than the third spacing, and the third unfixed terminal butts against the fourth unfixed terminal.

3. The grill of claim 1, wherein:
the second hinged pin and the third hinged pin are positioned on an upper part of the hinge seat, and the first hinged pin and the fourth hinged pin are positioned on a lower part of the hinge seat;
the second hinged pin and the third hinged pin are symmetrically disposed along a center line of the barbecue grill, and the first hinged pin and the fourth hinged pin are symmetrically disposed along the center line; and
a distance between the second hinged pin and the third hinged pin is smaller than a distance between the first hinged pin and the fourth hinged pin.

4. The grill of claim 3, wherein a first stop block is disposed on the hinge seat along the center line for preventing the second hinged member and the third hinged member from crossing the center line of the hinge seat.

5. The grill of claim 1, wherein the included angle between the first cover plate and the second cover plate is between 110 and 160 degrees, and the included angle between the first furnace wall and the second furnace wall is between 20 and 70 degrees.

6. The grill of claim 1, further comprising a curved bottom tank for collecting charcoal ash, the curved bottom tank comprising two ends fixedly connected to the hinge seat and an opening corresponding the included angle formed by the first furnace wall and the second furnace wall.

7. The grill of claim 6, wherein in the unfolded state, the first cover plate and the second cover plate butt against outer surfaces of the curved bottom tank.

8. The grill of claim 1, wherein the hinge seat further comprises second stop blocks which are adapted to limit the rotation of the second hinge members and the third hinge members in an unfolded state.

9. The grill of claim 1, wherein two sides of the first furnace wall are provided with support fans for locking the second furnace wall in the unfolded state.

10. The grill of claim 1, wherein:
a rotatable angle of the first cover plate is the same as that of the second cover plate;
a rotatable angle of the first furnace wall is the same as that of the second furnace wall;
the first cover plate and the second cover plate are symmetrically disposed; and
the first furnace wall and the second furnace wall are also symmetrically disposed.

* * * * *